(12) United States Patent  
Nies

(10) Patent No.: US 8,047,800 B2  
(45) Date of Patent: Nov. 1, 2011

(54) WIND TURBINE BLADES WITH IMPROVED BOND LINE AND ASSOCIATED METHOD

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/966,190

(22) Filed: Dec. 13, 2010

(65) Prior Publication Data

US 2011/0211970 A1 Sep. 1, 2011

(51) Int. Cl.  
*F03D 11/00* (2006.01)

(52) U.S. Cl. ........................................ 416/232

(58) Field of Classification Search .................... 416/232  
See application file for complete search history.

(56) References Cited

U.S. PATENT DOCUMENTS

| | | | |
|---|---|---|---|
| 6,800,956 B2 | 10/2004 | Bartlett | |
| 2007/0036659 A1 | 2/2007 | Hibbard | |
| 2008/0075603 A1* | 3/2008 | Van Breugel et al. | 416/232 |
| 2009/0226702 A1* | 9/2009 | Madsen et al. | 428/317.1 |
| 2010/0247325 A1* | 9/2010 | Stewart | 416/243 |
| 2011/0142663 A1* | 6/2011 | Gill | 416/226 |

* cited by examiner

*Primary Examiner* — Richard Edgar  
(74) *Attorney, Agent, or Firm* — Dority & Manning, P.A.

(57) ABSTRACT

A wind turbine blade includes an upper shell member and a lower shell member with an internal cavity therebetween. The shell members are joined at leading and trailing edges of the blade with a bond paste along a bond line having a designed width. A barrier is disposed within the internal cavity between the upper and lower shell members along at least one of the leading or trailing edges and prevents movement of the bond paste into the internal cavity beyond the width of the bond line. The barrier includes a wall that is substantially impermeable to the bond paste and a support member that extends from the wall to the leading or trailing edge of the blade. The support member locates the wall at the bond line and the wall has a shape and resiliency so as to be engaged against the upper and lower shell members within the internal cavity.

19 Claims, 4 Drawing Sheets

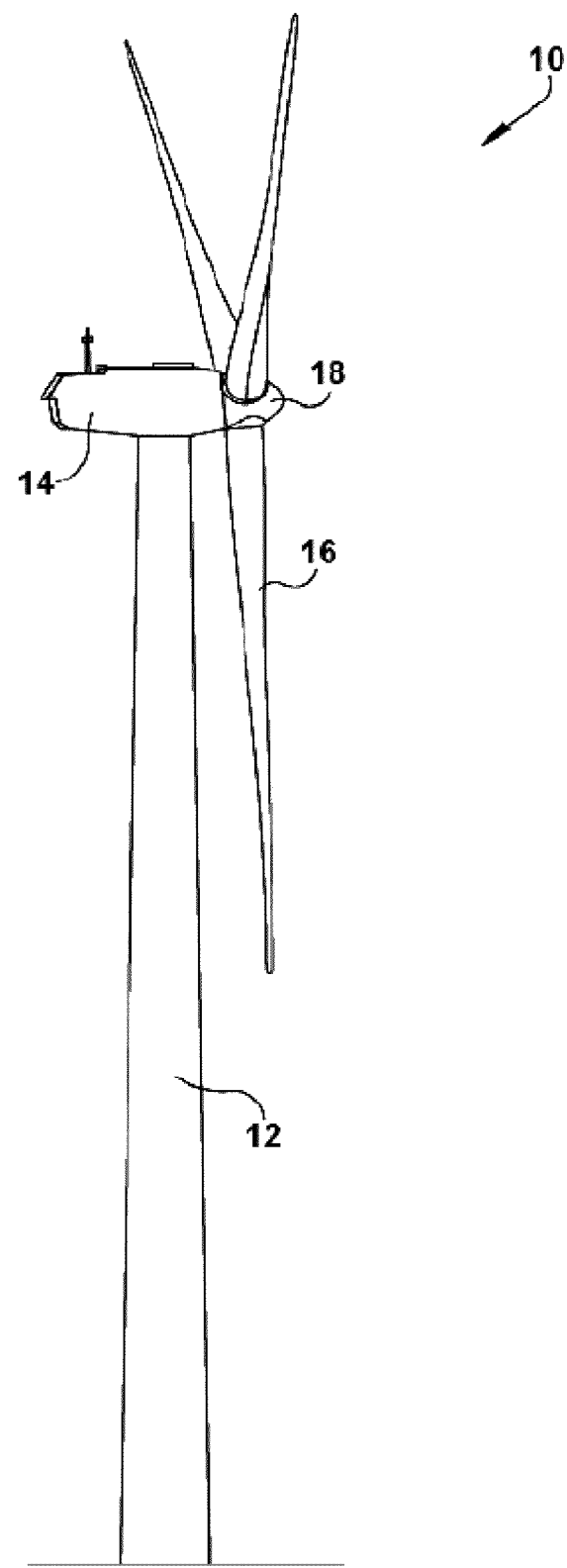
FIG. -1-

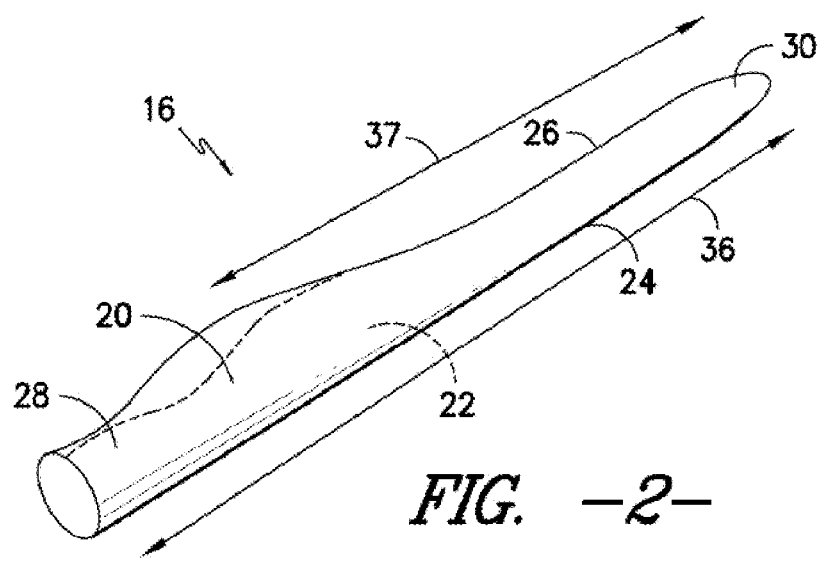
FIG. -2-
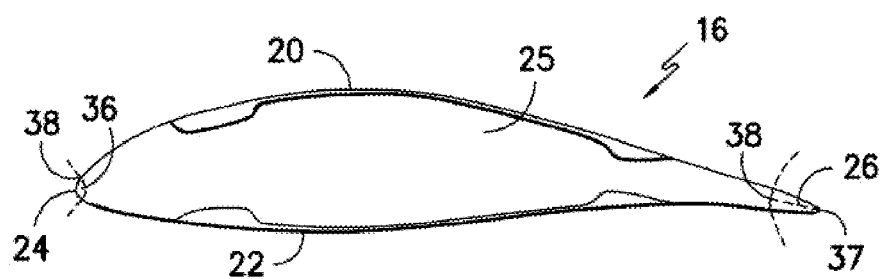
FIG. -3-
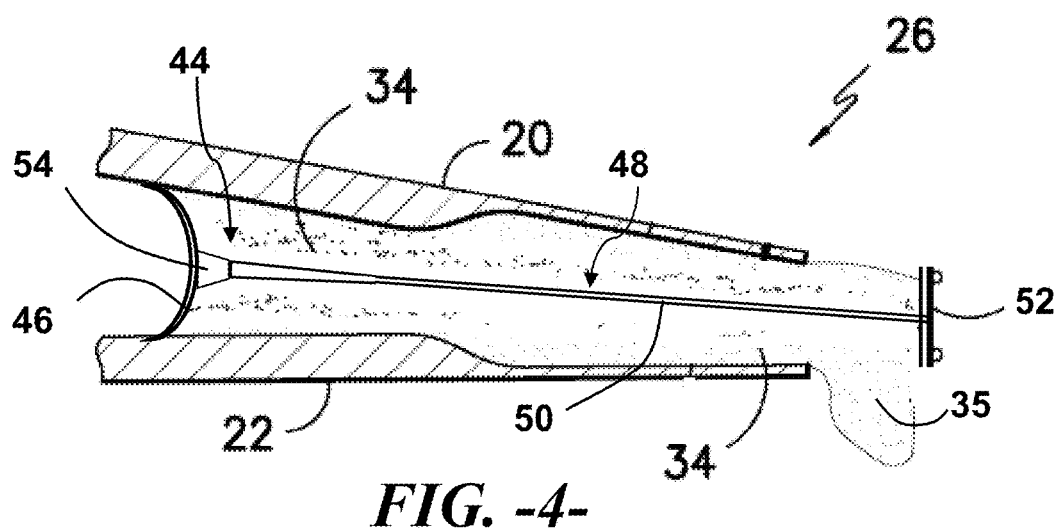
FIG. -4-

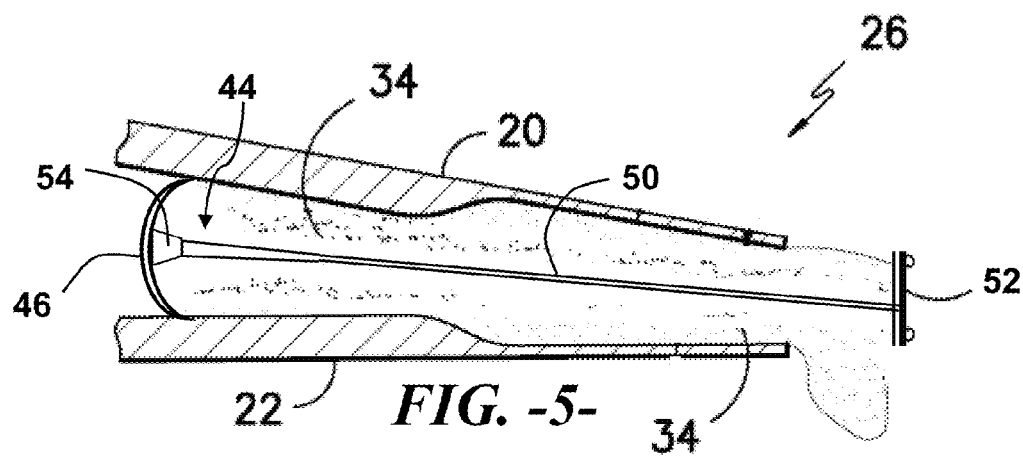
*FIG. -5-*
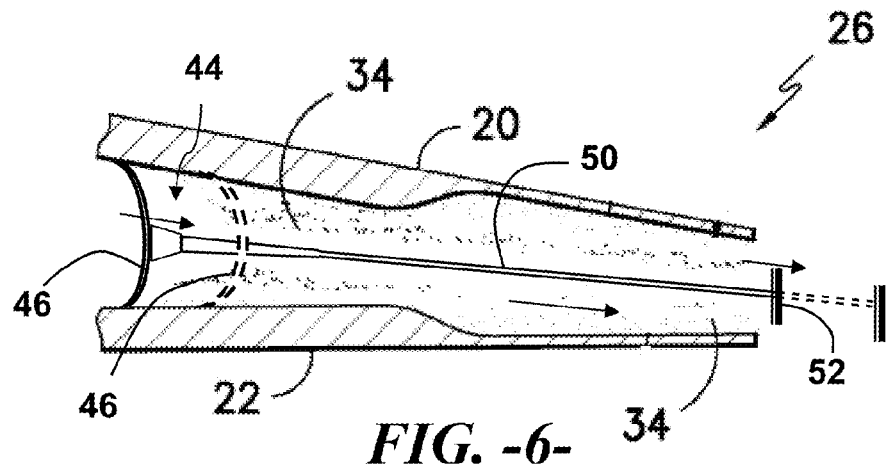
*FIG. -6-*
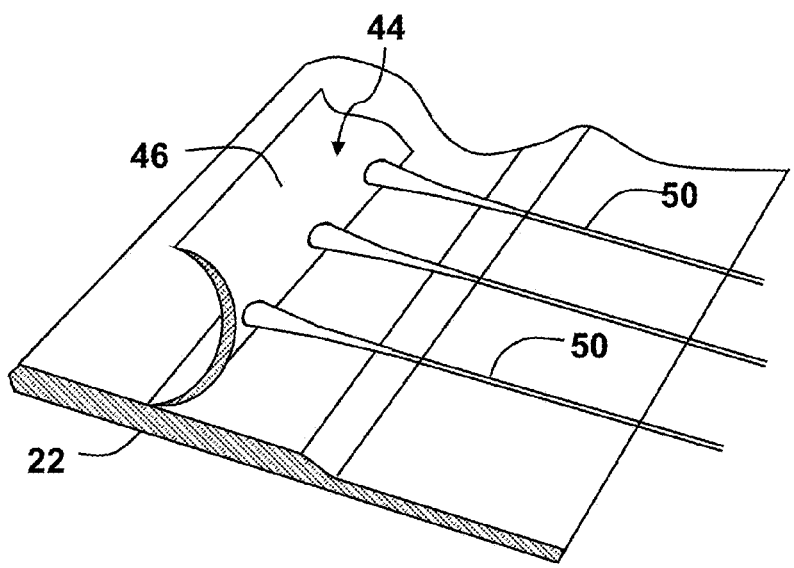
*FIG. -7-*

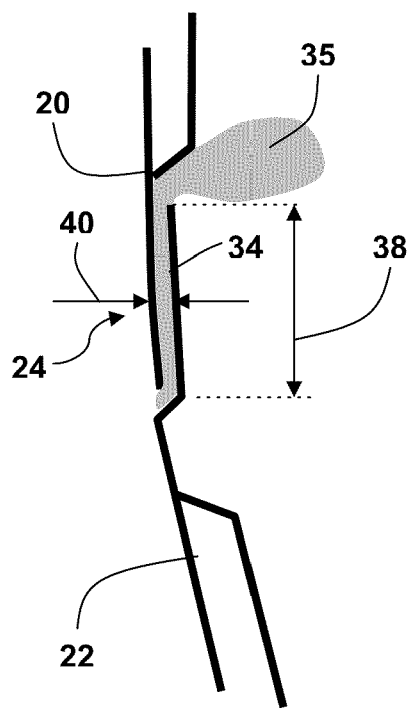
FIG. -8-
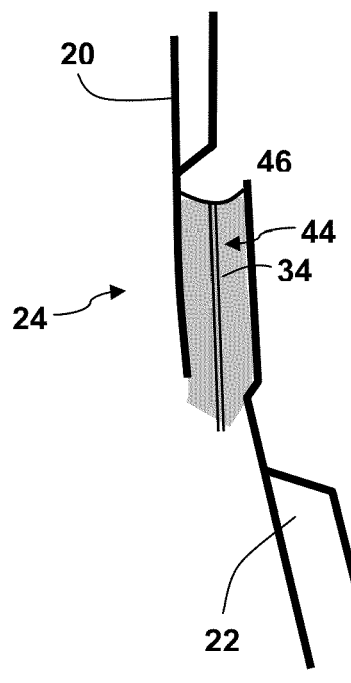
FIG. -9-
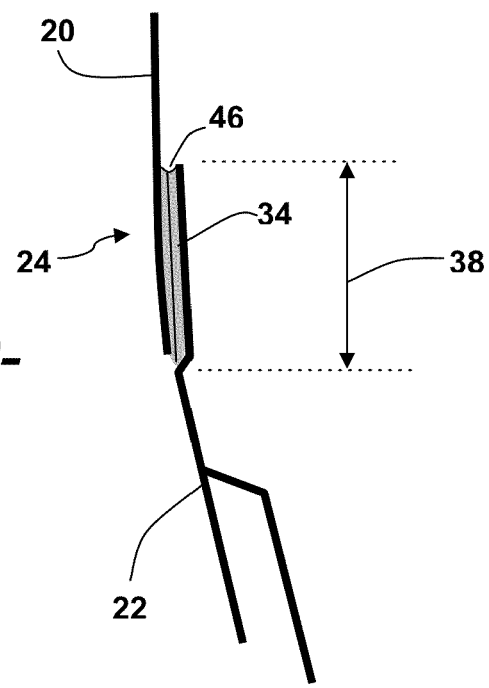
FIG. -10-

WIND TURBINE BLADES WITH IMPROVED BOND LINE AND ASSOCIATED METHOD

FIELD OF THE INVENTION

The present invention relates generally to the field of wind turbines, and more particularly to turbine blades having an improved trailing edge bond line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line at a minimum designed bond width between the shell members. The bond paste, however, tends to migrate well past the designed bond width and into the interior blade cavity, particularly along the trailing edge of the blade. This excess bond paste can add considerable weight to the blade and, thus, adversely affect blade efficiency and overall performance of the wind turbine. The excess bond paste can also break off and cause damage to interior structure and components during operation of the wind turbine.

Accordingly, the industry would benefit from an improved bond line configuration that reduces the amount of excess bond paste that migrates into the blade cavity, particularly along the trailing edge of the turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having an upper shell member and a lower shell member. The shell members define an internal cavity therebetween and are joined at leading and trailing edges of the blade with a bond paste along a bond line having a designed width. A barrier is disposed within the internal cavity between the upper and lower shell members along at least one of said leading or trailing edges. The barrier serves to prevent the bond paste from moving into the internal cavity to any appreciable extent beyond the bond line. In a particular embodiment, the barrier includes a wall that is substantially impermeable to the bond paste (and may be permeable to air) and a support member that extends from the wall to the leading or trailing edge of the blade, with the support member serving to locate the wall at the bond line. The wall has a shape and resiliency so as to be engaged against the upper and lower shell members within the internal cavity to adapt to variations in shape and dimension of the shell members.

In a particular embodiment, the wall is biased against the upper and lower shell members and is slidable along the shell members to the bond line by external actuation of the support member, which may be a rigid rod. A plurality of the support members may be spaced along the wall for positioning and manipulation of the wall along the entire length of thereof.

The wall may vary widely within the scope of the invention. In one embodiment, the wall may have a relatively stiff, pre-formed shape with edges that engage against the upper and lower shell members. The wall may have a preformed concave or convex shape or, alternatively, may be formed into a final design shape by external manipulation of the support members. For example, the wall may be pulled into a final concave shape with the support members.

The present invention also encompasses various method embodiments for forming a bond between upper and lower shell members along one or both of the leading or trailing edges of a wind turbine blade. The method may include placing a barrier between the upper and lower shell members, the barrier having a wall that is substantially impermeable to the bond paste and permeable to air. The barrier also has a support member that extends from the wall to the leading or trailing edge. The internal cavity is filled between the upper and lower shell members from the wall to the leading or trailing edge with a bond paste, and the shell members are then compressed to force excess bond paste out from between the shell members, with the wall being located at a bond line along the leading or trailing edge having a design bond width. The wall may be pulled into position along the bond line after depositing the bond paste by external manipulation of the support member(s). With this embodiment, the wall scrapes along the shell members and aids in forcing excess bond paste out from between the shell members.

With still further embodiments, the wall may be changed from a first shape into a final design shape, for example a final concave shape, within the internal cavity by external manipulation of the support member.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a wind turbine blade;

FIG. 3 is a cross-sectional view of an exemplary wind turbine blade in accordance with aspects of the invention;

FIG. 4 is an enlarged cross-sectional view of the trailing edge of a wind turbine blade in accordance with aspects of the invention;

FIG. 5 is a cross-sectional view of an alternative embodiment of a trailing edge bond configuration;

FIG. 6 is still another cross-sectional view of a different embodiment of a trailing edge bond configuration;

FIG. 7 is a perspective view of a sleeve embodiment;

FIG. 8 is a perspective view of an alternative sleeve embodiment;

FIG. 9 is a perspective view of another alternative embodiment of a sleeve;

FIG. 10 is a side cut-away view of a bond configuration at the leading edge of a wind turbine blade.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a bond line 36 along the leading edge 24 and a bond line 37 at the trailing edge 26. In formation of these bond lines 36, 37, a bond paste 34 in flowable viscous form is applied between the mating laminate surfaces of the upper shell member 20 and lower shell member 22 along the length of the bond lines 36, 37. It should be appreciated that the term "bond paste" is used herein in a generic sense to encompass any type of adhesive or bonding material that is applied in an initially flowable state. The particular type of bond paste 34 is not particularly relevant to the present invention, and any suitable type of epoxy, compound, or other material may be used in this regard.

The bond paste 34 is typically applied in a sufficient quantity and pattern so as to establish a designed bond line width 38 at the leading edge 24 and bond line width 37 at the trailing edge 26 that ensures a minimum bonded surface area between the components along the length of the respective bond lines 36, 37. For example, referring to FIG. 8, the leading edge 24 of a turbine blade 26 is depicted. Bond paste 34 is applied between opposite mating laminate surfaces of the upper shell member 20 and lower shell member 22 so as to define a bond having a designed bond width 38 and bond thickness 40. The design criteria for the bond width 38 and thickness 40 may vary between different types of blades based on any combination of design factors, as is well understood by those skilled in the art.

Referring again to FIG. 8, a particular problem associated with the conventional system and method for application of the bond paste 34 is that excess bond paste is squeezed out from between the mating surfaces of the upper shell member 20 and lower shell member 22 into the internal cavity 25 (FIG. 3) and eventually cures as a hardened mass 35 that adds significant weight to the blade 16. The same problem exists at the trailing edge 26 of the blade. The excess mass of bond paste 35 does not add any degree of structural integrity or other useful purpose to the blade 16.

FIGS. 4 through 7 depict a wind turbine blade 16 that utilizes a barrier 44 disposed within the internal cavity 25 between the upper and lower shell members 20, 22 along the trailing edge 26 of the blade. A barrier 44 may also be used at the bond line 36 along the leading edge 24, as depicted in FIGS. 8 through 10. The bond paste 34 is contained within the internal cavity 25 to the design bond width 38 by the barrier 44 and is prevented by the barrier 44 from migrating to any significant extent further into the internal cavity 25.

The barrier 44 includes a wall 46 that extends between the upper and lower shell members 20, 22 within the internal cavity 25. The wall 46 is formed of a suitable material (or combination of materials) that render it substantially impermeable to the bond paste 34 in it flowable state and, desirably, permeable to air. The wall 46 may be formed, for example, from a resilient screen, laminate of mesh materials, a mesh and screen laminate, and so forth. The wall 46 has a shape and resiliency so as to assume a biased, engaged state against the shell members 20, 22, as depicted in FIGS. 4 through 6. In a unique embodiment, the wall 46 is slidable against the shell members 20, 22 so as to essentially scrape against the shell members for initial positioning of the wall 46, as described in greater detail below. The wall 46 may have a longitudinal length so as to extend along the bond line 37, 38 within the internal cavity 25 of the blade 16. Alternatively, a series of separate walls 46 may be disposed along the bond line 37, 38. In particular embodiments, the wall 46 is capable of adapting or conforming to changes in the shape and dimensions along the upper and lower shell members 20, 22.

The barrier 44 includes a support member 48 that is engaged with the wall 46 and extends from the wall 46 to the trailing edge 26. The support member 48 may be a pliable member, such as a cable or cord-like member that can be externally manipulated to exert pulling force on the wall 46 towards the trailing edge 26. In an alternate embodiment, the support member 48 may be a light-weight rod member 50 that allows for a pulling or pushing force to be applied to the wall 46. It should be appreciated that a plurality of the support members 48 (particularly the rods 50) may be spaced apart along the length of the wall 46, as depicted in FIG. 7, for variable positioning and support of wall 46 along the length thereof. The rods 50 may be attached to the wall 46 at suitable reinforced attachment locations 54. The rods 50 may have an increasing diameter closer towards the wall 46, as indicated in the figures, to provide further stability to the wall 46.

The support members 48 serve to initially locate the wall at an initial position within the internal cavity 25, which may be at the design bond width 38. The support members 48 extend beyond the edge 26 and are anchored with any suitable anchoring mechanism 52 to prevent further movement of the wall 46 within the internal cavity 25 during the bonding process. The bond width 38 is thus readily achieved and excess bond paste 34 does not extend beyond the bond width 38.

As mentioned, the wall 46 is substantially impermeable to the bond paste 34 and, desirably, is permeable to air. Thus, upon compressing the shell members 20, 22, air in the bond paste 34 escapes through the wall 46, thereby reducing the likelihood of detrimental air pockets forming in the cured paste. It should be readily understood that the permeability of the wall 46 will be a function of the viscosity of the bond paste 34 in its flowable state and, thus, may vary widely within the scope and spirit of the invention.

In one embodiment, the wall 46 may be a rigid member having a pre-formed shaped and a sufficient degree of resiliency to be biased against the shell members 20, 22 without breaking or cracking during the bonding process or lifetime of the blade. For example, the wall 46 may be a pre-formed wire screen, or a screen-mesh laminate that is initially formed into a desired shape.

The wall may 46 have a convex shape (curves outwardly), as in FIG. 5. This shape may be pre-formed into the wall material or, alternatively, may simply be the result of the material weight of the bond paste 34 pushing against a more-pliant wall 46 upon compressing the shell members 20, 22.

In an alternate embodiment depicted in FIGS. 4 and 6, the wall 46 may be formed into a stress-reducing profile, such as the concave (curves inwardly) shape depicted in the figures. This shape may also be pre-formed into wall 46. In the unique embodiment depicted in FIG. 6, the concave shape is induced into the wall 46 by pulling a plaint wall 46 towards the trailing edge 56 with the rods 50, which causes the wall 46 to scrape against the shell members 20, 22 and bow towards the edge 26 as the space between the shell members decreases in the direction of the edge 26, as depicted by the dashed lines in FIG. 6. This embodiment may be beneficial in that the wall 26 (which may be a substantially flat, semi-rigid component) may be initially positioned with the internal cavity 25 well beyond the bond width 38, with the bond paste 34 being subsequently poured into the internal cavity 25. The wall 46 may then be pulled towards the edge 26 to the bond line 37 (at the bond width 38). As the wall is moved, it scrapes against the shell members 20, 22 and forces the bond paste 34 to fill any spaces or pockets in the internal cavity 25 as the paste is squeezed towards the edge 26. Any air in the bond paste 34 is forced through the wall 46 or out through the edge 26 with any excess bond paste 34.

As mentioned, the barrier 44 may be utilized along either or both of the trailing edge 26 or leading edge 24 of the blade 16. FIGS. 8 through 10 depict a barrier 44 placed between overlapping laminate portions of the upper and lower shell members 20, 22 to form a bond along the leading edge 24 having a bond width 38.

After sufficient curing time, the support members 48 and any excess bond paste 35 (FIGS. 4 and 8) that was squeezed from between the shell members 20, 22 is trimmed along the trailing edge 26 to present a finished bond between the shell members 20, 22. The amount of excess bond paste 35 may be measured and recorded, with this value being used to reduce the amount of bond paste 34 used in the formation of additional blades 16.

The present invention also encompasses various methods for forming a bond between upper and lower shell members 20, 22 along at least one of the leading or trailing edges 24, 26 of a wind turbine blade 16 with a barrier 44 in accordance with the aspects discussed above. Any of the features discussed above with respect to the barrier 44 or application of the barrier within the internal cavity 25 of the blade 16 may be incorporated into the various method embodiments.

Because the barrier 44 blocks the flow of the bond paste 34 into the internal cavity 25 of the blade 16, the present invention may provide the additional benefit that the viscosity of the bond paste 34 may be lowered or otherwise modified to ensure a more complete application and elimination of air pockets or voids between the shell members along the bond line without the concern that a more viscous paste would more readily migrate into the cavity 25.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments.

Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
an upper shell member and a lower shell member;
said upper shell member and said lower shell member defining an internal cavity therebetween and joined at leading and trailing edges of said blade with a bond paste along a bond line having a designed width; and,
a barrier disposed within said internal cavity between said upper and lower shell members along at least one of said leading or trailing edges, said barrier comprising a wall located along said bond line that is substantially impermeable to said bond paste and a support member that extends from said wall to said leading or trailing edge of said blade, said support member maintaining said wall at said bond line; and
said wall having a shape and resiliency so as to be engaged against said upper and lower shell members within said internal cavity.

2. The wind turbine blade as in claim 1, wherein said wall is permeable to air.

3. The wind turbine blade as in claim 2, wherein said wall is formed from a combination of materials that render said wall substantially impermeable to said bond paste, permeable to air, and with a sufficient degree of resiliency to be biased against said upper and lower shell members.

4. The wind turbine blade as in claim 1, wherein said wall is slidable along said upper and lower shell members to said bond line by external actuation of said support member.

5. The wind turbine blade as in claim 1, wherein said support member is a rigid rod member.

6. The wind turbine blade as in claim 5, comprising a plurality of said rod members spaced along said wall.

7. The wind turbine blade as in claim 1, wherein said wall has a stiff, pre-formed shape with edges that engage against said upper and lower shell members.

8. The wind turbine blade as in claim 1, wherein said wall has a concave shape.

9. The wind turbine blade as in claim 1, wherein said wall has a convex shape.

10. The wind turbine blade as in claim 1, wherein said barrier is applied along said trailing edge.

11. A method for forming a bond between upper and lower shell members along at least one of the leading or trailing edges of a wind turbine blade, said method comprising:
placing a barrier between the upper and lower shell members, the barrier having a wall that is substantially impermeable to the bond paste and permeable to air, the barrier also having a support member that extends from the wall to the leading or trailing edge;
filling an internal cavity between the upper and lower shell members from the wall to the leading or trailing edge with a bond paste and compressing the shell members to force excess bond paste out from between the shell members; and wherein the wall is located at a bond line along the leading or trailing edge having a design bond width.

12. The method as in claim 11, further comprising pulling the wall into position along the bond line by external manipulation of the support member.

13. The method as in claim 12, wherein the barrier includes a plurality of the support members spaced along the wall, and further comprising manipulating the plurality of the support members to position the wall along the bond line along the length of the leading or trailing edge.

14. The method as in claim 12, wherein the wall is pulled into position after the bond paste is filled into the internal cavity such that the wall scrapes along the shell members and aids in forcing excess bond paste out from between the shell members.

15. The method as in claim 11, wherein the wall is changed from a first shape into a final design shape within the internal cavity by external manipulation of the support member.

16. The method as in claim 15, wherein the wall is changed into a final concave shape.

17. The method as in claim 11, further comprising trimming excess bond paste that migrated out from the leading or trailing edge.

18. The method as in claim 17, further comprising measuring the amount of excess bond paste trimmed from the leading or trailing edge and reducing the amount of bond paste initially placed into a subsequent blade by the measured amount of trimmed bond paste.

19. The method as in claim 11, wherein the barrier is applied along the trailing edge.

\* \* \* \* \*